United States Patent
Mori

(10) Patent No.: US 7,898,689 B2
(45) Date of Patent: Mar. 1, 2011

(54) IMAGE PROCESSING CIRCUIT, GRADATION CONVERTING METHOD, AND PRINTING APPARATUS

(75) Inventor: Shunichiro Mori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 622 days.

(21) Appl. No.: 11/857,524

(22) Filed: Sep. 19, 2007

(65) Prior Publication Data

US 2008/0252914 A1    Oct. 16, 2008

(30) Foreign Application Priority Data

Sep. 19, 2006    (JP) .............................. 2006-252313

(51) Int. Cl.
*G06F 15/00*    (2006.01)
*G06K 9/00*    (2006.01)

(52) U.S. Cl. ..................... 358/1.9; 358/521; 358/1.1; 358/1.15; 358/518; 382/167; 382/272; 382/278; 382/162; 382/254

(58) Field of Classification Search ................ 358/1.9, 358/1.1, 1.6, 1.8, 1.15, 1.17, 3.09, 3.1, 3.12, 358/518, 520, 302, 406, 521; 382/162, 164, 382/167, 254, 266, 278, 279; 347/5, 12, 347/14–16, 19, 42, 43, 86, 115, 131, 172, 347/232, 240, 251, 253
See application file for complete search history.

(56) References Cited

U.S. PATENT DOCUMENTS 4,954,889 A * 9/1990 Endo et al. .................. 358/517
5,123,059 A * 6/1992 Hirosawa et al. ............ 382/272
7,099,043 B2 * 8/2006 Miyagi ....................... 358/1.9

FOREIGN PATENT DOCUMENTS

JP    2006-197359 A    7/2006

* cited by examiner

*Primary Examiner*—Edward L Coles
*Assistant Examiner*—Steven Kau
(74) *Attorney, Agent, or Firm*—Sughrue Mion, PLLC

(57) ABSTRACT

An input gradation converting circuit has a gradation conversion table in which M-bit intermediate gradation data are correlated with each of N-bit input gradation data, and is operable to convert each of the input gradation data into the M-bit intermediate gradation data by using the gradation conversion table and output the converted M-bit intermediate gradation data. A diffusion gradation converting circuit is operable to convert each of the intermediate gradation data outputted from the input gradation converting circuit into N-bit output gradation data and output the converted N-bit output gradation data. The diffusion gradation converting circuit acquires a uniform random number Rnd in the range of $-SFT/2$ to $SFT/2$ and outputs $[X+Rnd+0.5]$ as the output gradation data for each of the intermediate gradation data in which X obtained by dividing a value of the intermediate gradation data by $2^{M-N}$ and a specified value SFT satisfy a conditional expression "$SFT/2 \leq [X] \leq 2^N - 1 - SFT/2$" (where [ ] is a Gauss symbol). The diffusion gradation converting circuit acquires a uniform random number Rnd' in the range of $0 \leq [X+Rnd'+05] \leq 2^N - 1$ and outputs $[X+Rnd'+0.5]$ as the output gradation data for each of the intermediate gradation data in which the X and the specified value SFT do not satisfy the conditional expression.

4 Claims, 5 Drawing Sheets

FIG. 6 PRIOR ART
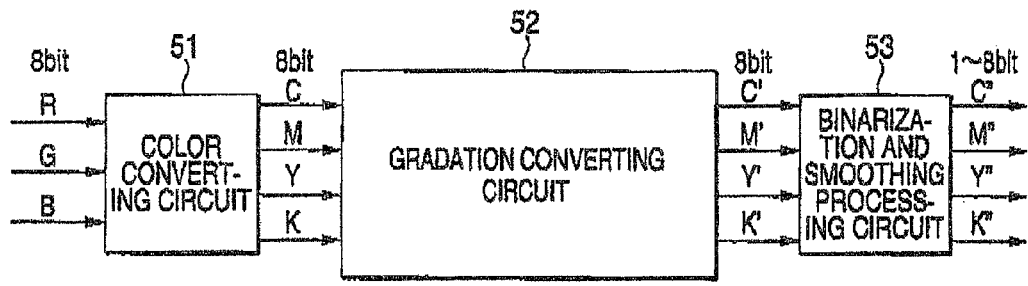
FIG. 7 RELATED ART
| INPUT (8bit) | 0 | 1 | 2 | 3 | 4 | ... | 92 | 93 | 94 | ... | 252 | 253 | 254 | 255 |
|---|---|---|---|---|---|---|---|---|---|---|---|---|---|---|
| OUTPUT (8bit) | 0 | 0 | 0 | 1 | 1 | ... | 50 | 51 | 52 | ... | 254 | 255 | 255 | 255 |
FIG. 8 PRIOR ART
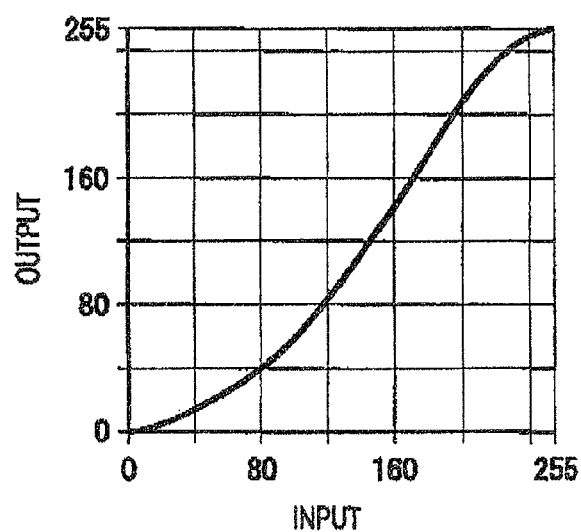

IMAGE PROCESSING CIRCUIT, GRADATION CONVERTING METHOD, AND PRINTING APPARATUS

The disclosure of Japanese Patent Application No. 2006-252313 filed Sep. 19, 2006 including specification, drawings and claims is incorporated herein by reference in its entirety.

BACKGROUND

The present invention relates to an image processing circuit performing a gradation conversion of image data (a gradation data set), a gradation converting method, and a printing apparatus performing a gradation conversion of image data at the time of printing images of the image data.

In general printers currently available on the market, an image processing circuit generates data for operating a print engine on the basis of an RGB data set which a CPU in the printer generates by analyzing print data (or, on the basis of an RGB data set which is transmitted, as print data, from a host). However, existing image processing circuits are configured to decrease the number of gradations.

Specifically, as an image processing circuit for a color printer, there is an image processing circuit having a configuration shown in FIG. 6. In the image processing circuit, a gradation converting circuit 52 converts 8-bit Z data sent (Z=C, M, Y, and K) from a color converting circuit 51 into 8-bit Z' data by the use of a gradation conversion table as shown in FIG. 7 (gradation conversion table for performing a gradation conversion as shown in FIG. 8). The color converting circuit 51 is a circuit for converting 8-bit R, G, and B data into 8-bit C, M, Y, and K data. A binarization and smoothing processing circuit 53 is a circuit for converting the Z' data supplied from the gradation converting circuit 52 into Z" data (data for operating the print engine) to be used as a depiction width of each pixel.

Since it is necessary to perform the gradation conversion shown in FIG. 8, some values are not set as outputs in the gradation conversion table. Accordingly, in the image processing circuit, the number of gradations is reduced by the processing of the gradation converting circuit 52.

In another image processing circuit different from the circuit shown in FIG. 6 in a specific configuration, the gradation converting process of decreasing the number of gradations is performed in a manner similar to the case of the above-mentioned image processing circuit (e.g., see Japanese Patent Publication No. 2006-197359A).

SUMMARY

It is therefore an object of the invention to provide an image processing circuit and a gradation converting method capable of performing gradation conversion with a high precision. It is another object of the invention to provide a printing apparatus capable of printing with a higher quality than the related-art apparatus.

In order to solve the above-mentioned problems, there is provided an image processing circuit comprising:

an input gradation converting circuit, having a gradation conversion table in which M-bit intermediate gradation data are correlated with each of N-bit input gradation data, and operable to convert each of the input gradation data into the M-bit intermediate gradation data by using the gradation conversion table and output the converted M-bit intermediate gradation data; and a diffusion gradation converting circuit, operable to convert each of the intermediate gradation data outputted from the input gradation converting circuit into N-bit output gradation data and output the converted N-bit output gradation data, wherein:

the diffusion gradation converting circuit acquires a uniform random number Rnd in the range of $-SFT/2$ to $SFT/2$ and outputs $[X+Rnd+0.5]$ as the output gradation data for each of the intermediate gradation data in which X obtained by dividing a value of the intermediate gradation data by $2^{M-N}$ and a specified value SFT sat a conditional expression "$SFT/2 \leq [X] \leq 2^N - 1 - SFT/2$" (where [ ] is a Gauss symbol); and the diffusion gradation converting circuit acquires a uniform random number Rnd' in the range of $0 \leq [X+Rnd'+05] \leq 2^N - 1$ and outputs $[X+Rnd'+0.5]$ as the output gradation data for each of the intermediate gradation data in which the X and the specified value SFT do not satisfy the conditional expression.

That is, the image processing circuit according to an aspect of the invention is operable to convert the N-bit input gradation data into the M-bit intermediate data and then to convert the intermediate gradation data into the N-bit output gradation data on the basis of an algorithm in which an expected value corresponds to X (X is a value obtained by dividing the intermediate gradation data by $2^{M-N}$). Since the image processing circuit of the invention does not reduce the number of gradations at the time of gradation conversion (i.e., the number of gradations of input gradation data is equal to that of output gradation data), the image processing circuit can perform the gradation conversion with a higher precision than the related-art image processing circuit.

In realizing (manufacturing) the image processing circuit of the invention, the diffusion gradation converting circuit may acquire the uniform random number Rnd' in the range of $-(2 \cdot [X]+X-[X]+0.5])/2$ to $(2 \cdot [X]+X-[X]+0.5])/2$ for each of the intermediate gradation data in which the X and the specified value SFT satisfy $SFT/2>[X]$; and the diffusion gradation converting circuit may acquire the uniform random number Rnd' in the range of $-(2 \cdot (2^N - 1 - [X])-[X-[X]+0.5])/2$ to $(2 \cdot (2^N - 1 - [X])-[X-[X]+0.5])/2$ for each of the intermediate gradation data in which the X and the specified value SFT satisfy $SFT/2>2^N-1-[X]$. In addition, the diffusion gradation converting circuit may acquire a uniform random number Rnd' in the range of $-0.5$ to $0.5$ for each intermediate gradation data in which the X and the specified value SFT do not satisfy the conditional expression, and to output $[X+Rnd'+0.5]$ as output gradation data.

In a similar manner to the case of the image processing circuit, the gradation convening method according to another aspect of the invention is configured to convert the N-bit input gradation data into the M-bit intermediate gradation data and then to convert the intermediate gradation data into the N-bit output gradation data on the basis of an algorithm in which an expected value corresponds to X (X is a value obtained by dividing intermediate gradation data by $2^{M-N}$). Accordingly, by using the gradation converting method according to the invention, it is possible to perform gradation conversion with a higher precision than that of the related-art gradation converting method.

Further, the printing apparatus according to a further aspect of the invention includes the image processing circuit of the invention and performs printing by using the image processing circuit. Therefore, the printing apparatus according to the invention can perform printing with a higher quality than that of the related-art apparatus.

BRIEF DESCRIPTION OF THE DRAWINGS

The above objects and advantages of the present invention will become more apparent by describing in detail preferred exemplary embodiments thereof with reference to the accompanying drawings, wherein:

FIG. 6 is a diagram illustrating an image processing circuit used in a related-art color printer;

FIG. 7 is a gradation conversion table in a related-art image processing circuit; and FIG. 8 is a diagram illustrating a gradation conversion performed by the related-art image processing circuit on the basis of the gradation conversion table.

DETAILED DESCRIPTION OF THE EMBODIMENTS

Hereafter, embodiments of the invention will be described in detail with reference to the drawings.

First, an overview of a printing apparatus 10 according to an embodiment of the invention will be described with reference to FIGS. 1 and 2.

Figure 1:
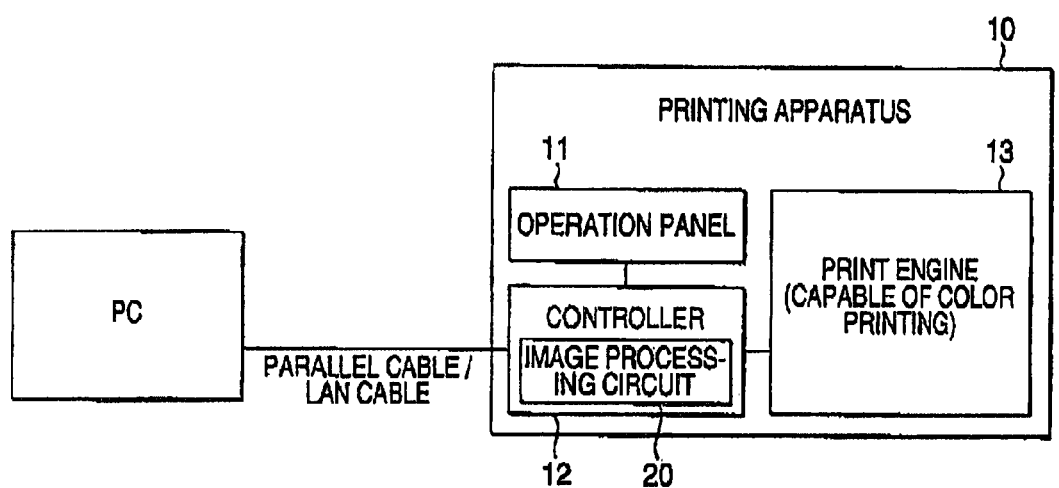
FIG. 1 is a diagram illustrating a printing apparatus according to an embodiment.

As shown in FIG. 1, the printing apparatus 10 according to the embodiment of the invention includes an operation panel 11, a controller 12, and a print engine 13. The printing apparatus 10 is connected to a PC (personal computer) having a printer driver for the printing apparatus installed therein via a parallel cable or a LAN cable.

The print engine 13 of the printing apparatus 10 is a unit that performs a color or monochrome printing operation on a sheet. The operation panel 11 is interface means for connecting the printing apparatus 10 to a user, and is provided on a case of the printing apparatus 10. The operation panel 11 includes an LCD, a plurality of LEDs, a push-button switch, and the like.

The controller 12 is a unit that performs processes (e.g., process causing the print engine 13 to perform printing) of the contents designated by the data sent from the PC.

The printing apparatus 10 according to the present embodiment is different from the related-art printing apparatus only in that a configuration of an image processing circuit 20 mounted on a controller 2 for the present embodiment is different from that of the related-art printing apparatus (i.e., the image processing circuit 20 is mounted instead of the related-art image processing circuit).

Next, a configuration and an operation of the image processing circuit 20 used in the printing apparatus 10 (controller 12) of the present embodiment will be described with reference to FIGS. 2 to 6.

Figures 2, 3:
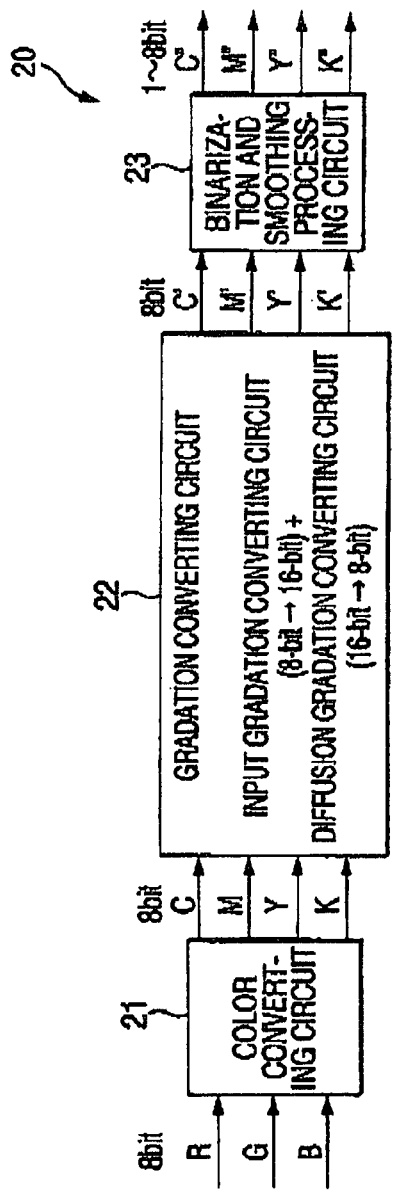
FIG. 2 is a diagram illustrating an image processing circuit according to the embodiment.
FIG. 3 is a gradation conversion table to which an input gradation converting circuit in the image processing circuit according to the embodiment refers.

As shown in FIG. 2, the image processing circuit 20 includes a color converting circuit 21, a gradation converting circuit 22, and a binarization and smoothing processing circuit 23.

The color converting circuit 21 and the binarization and smoothing processing circuit 23 in the image processing circuit 20 are the same as the color converting circuit 51 and the binarization and smoothing processing circuit 53 shown in FIG. 6, respectively.

The gradation converting circuit 22 is a circuit for converting 8-bit Z data (Z=C, M, Y, and K) into 8-bit Z' data in a manner similar to the case of the gradation converting circuit 52. However, the gradation converting circuit 22 is not a circuit for only outputting data stored in a gradation conversion table as a conversion result of the Z data. The gradation converting circuit 22 is configured to covert 8-bit Z data into 16-bit data (hereinafter, referred to as intermediate gradation data), and then convert the 16-bit intermediate gradation data into 8-bit Z' data, thereby outputting the converted data.

Specifically, the gradation converting circuit 22 includes input gradation converting circuits and diffusion gradation converting circuits which are provided for each Z data, respectively.

Each of the input gradation converting circuits in the gradation converting circuit 22 is a circuit for converting the 8-bit Z data into the 16-bit intermediate gradation data for Z data by the use of a gradation conversion table as shown in FIG. 3 (which is a gradation table that stores data (having double the number of bits) with a higher precision than that of the gradation conversion table shown in FIG. 7).

Figure 4:
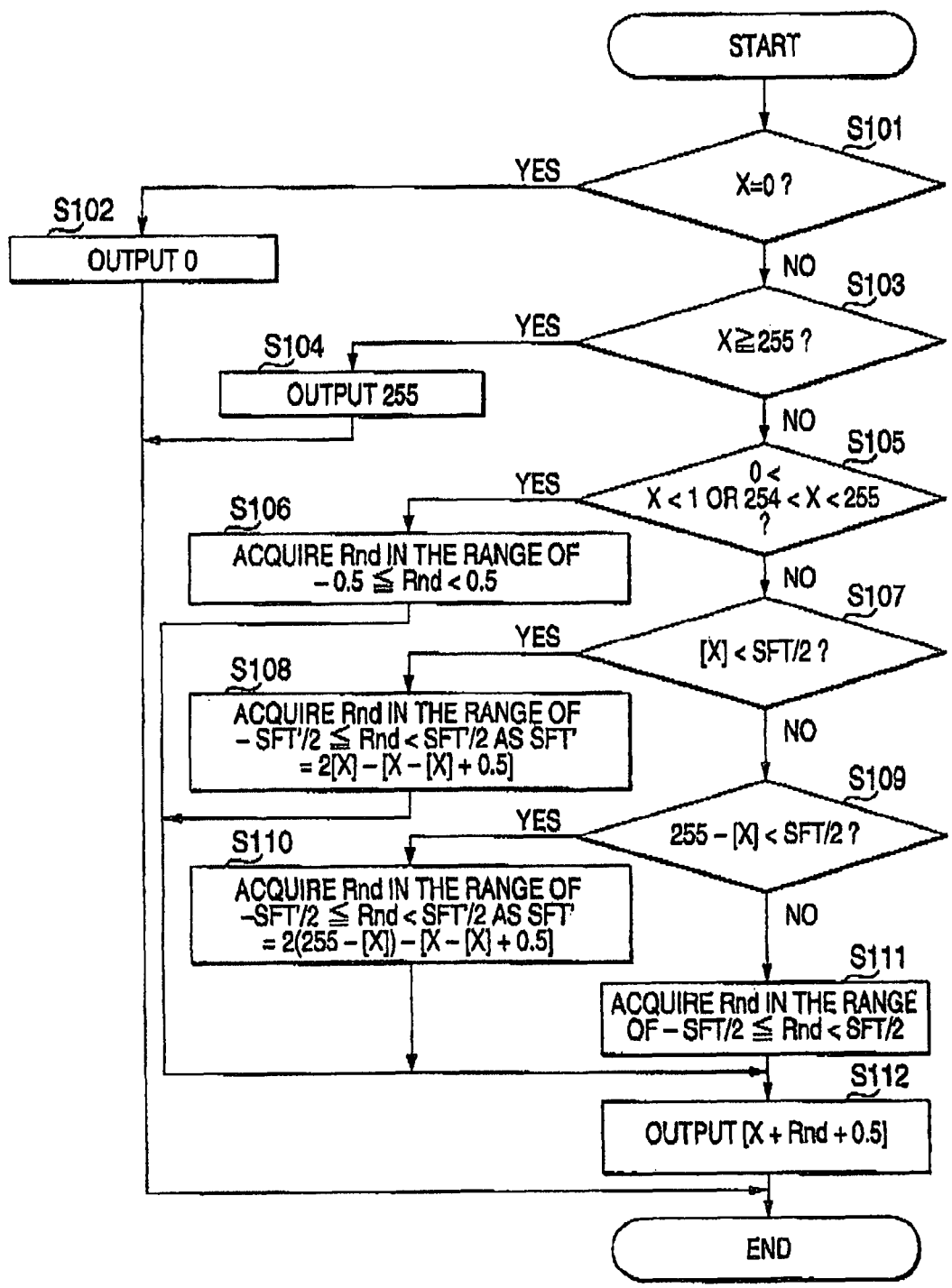
FIG. 4 is a flowchart illustrating processes executed by a diffusion gradation converting circuit in the image processing circuit according to the embodiment.
Figure 5:
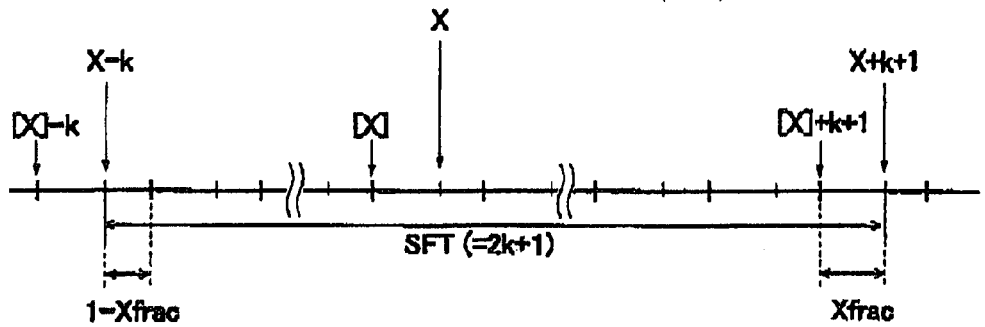
FIGS. 5(A) to 5(C) are diagrams showing a meaning of the processes executed by the diffusion gradation converting circuit in the image processing circuit according to the embodiment.
Figure 5:
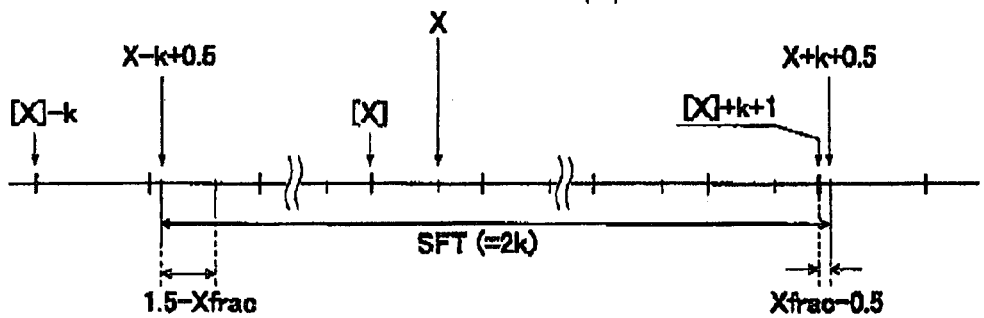
Figure 5:
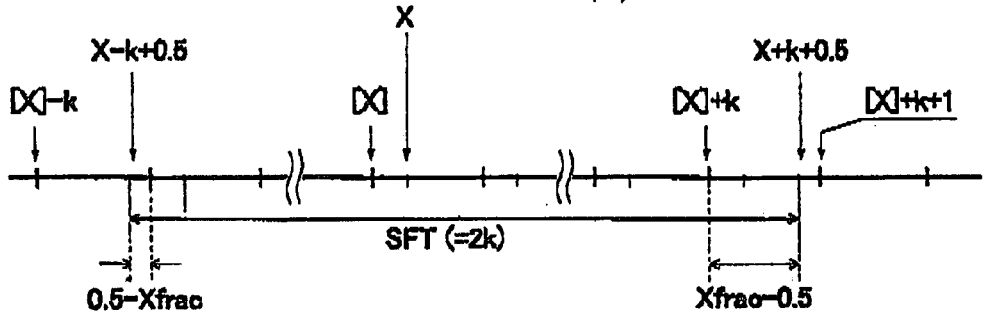

Each of the diffusion gradation converting circuits in the gradation converting circuit 22 is a circuit for performing a process shown in FIG. 4 for the 16-bit intermediate gradation data that are outputted from a corresponding one of the input gradation converting circuits. As used in FIG. 4 and the following descriptions, X is a value obtained by dividing a value of the 16-bit intermediate gradation data by $2^8$.

That is, when the intermediate gradation data is inputted, the diffusion gradation converting circuit judges whether "X=0" is satisfied or not (Step S101). When "X=0" is satisfied (Step S101: YES), the diffusion gradation converting circuit outputs "0" as a conversion result (Z' data) (Step S102); and then the process (process in FIG. 4) for the inputted intermediate gradation data ends.

When "X=0" is not satisfied (Step S101: NO), the diffusion gradation converting circuit judges whether "X≧255" is satisfied or not (Step S103). When "X≧255" is satisfied (Step S103: YES), the diffusion gradation converting circuit outputs "255" as a conversion result (Step S104) and then the process for the inputted intermediate gradation data ends.

When "X≧255" is not satisfied (step S103: NO), the diffusion gradation converting circuit judges whether "0<X<1 or 254<X<255" is satisfied or not (Step S105). When "0<X<1 or 254<X<255" is satisfied (Step S105: YES), the diffusion gradation converting circuit acquires a uniform random number Rnd in the range of −0.5 to 0.5 (Step S106) and outputs [X+Rnd+0.5] (where [ ] is a Gauss symbol) as a conversion result (Step S112); and then the process for the inputted intermediate gradation data ends.

When "0<X<1 or 254<X<255" is not satisfied (Step S105: NO), the diffusion gradation converting circuit judges whether "[X]<STF/2" is satisfied or not (Step: S105). In this case, SFT is an integer (e.g., "15") preset in the image processing circuit 20.

When "[X]<SFT/2" satisfied (Step S107: YES), the diffusion gradation converting circuit acquires a uniform random number Rnd in the range of −(2·[X]+[X−[X]+0.5])/2 to (2·

[X]+[X−[X]+0.5])/2 (Step S108). Then, the diffusion gradation converting circuit outputs [X+Rnd+0.5] as a conversion result (Step S112) and then the process for the inputted intermediate gradation data ends.

Meanwhile, when "[X]<SFT/2" is not satisfied (Step S107: NO), the diffusion gradation converting circuit judges whether "255−[X]<SFT/2" is satisfied or not (Step S109). When "255−[X]<SFT/2" is satisfied (Step S109: YES), the diffusion gradation converting circuit acquires a uniform random number Rnd in the range of −(2·(255−[X])·[X−[X]+0.5])/2 to (2·(255−[X])−[X−[X]+0.5])/2 (Step S110). Then, the diffusion gradation converting circuit outputs [X+Rnd+0.5] as a conversion result (Step S112) and then the process for the inputted intermediate gradation data ends.

When "255−[X]<SFT/2" is not satisfied (Step S107: YES), the diffusion gradation converting circuit acquires a uniform random number Rnd in the range of −SFT/2 to SFT/2 (Step S111) and outputs [X+Rnd+0.5] as a conversion result (Step S112); and then the process for the inputted intermediate gradation data ends.

Hereinafter, the operation (meaning of the process in FIG. 4) of the diffusion gradation converting circuit will be described in more detail with reference to FIGS. 5(A) to 5(C).

It is assumed that intermediate gradation data (intermediate gradation data satisfying SFT/2≦[X]<255−SFT/2) is inputted to perform the process of Step S111 under the condition where 2 k+1 (odd number) is set as SFT.

In this case, a value of "X+Rnd+0.5" is in the range of X−k to X+k+1 as shown in FIG. 5(A). Since the Rnd acquired in the process of Step S111 is a uniform random number, in the process of Step S112 "[X]·k" (=[X·k]) is outputted in the probability of (1−Xfrac)/(2 k+1) (Xfrac is X−[X]: decimal fraction of X); "[X]+k+1" (=[X+k+1]) is outputted in the probability of Xfrac(2 k+1); and each integer in the range of "[X]−k+1" to "[X]+k" is outputted in the probability of 1/(2 k+1).

In this case, an expected value of the data (data outputted in the process of Step S112) outputted as a conversion result from the diffusion gradation converting circuit is equal to X as descried below.

$$\begin{aligned}\text{Expected Value} &= ([X]-k)\cdot\frac{1-Xfrac}{2k+1} + \\ &\quad ([x]+k+1)\cdot\frac{Xfrac}{2k+1}+\sum_{y=-k+1}^{k}\frac{[X]-y}{2k+1} \\ &= ([X]+k+1-[X]+k)\cdot\frac{Xfrac}{2k+1}+\sum_{y=-k}^{k}\frac{[X]-y}{2k+1} \\ &= Xfrac + [X] \\ &= X\end{aligned}$$

When intermediate gradation data in which Xfrac is 0.5 or more is inputted to perform the process of Step S111 under the condition where 2 k (even number) is set as SFT, a value of "X+Rnd+0.5" is in the range of X−k+0.5 to X+k+0.5 as shown in FIG. 5(B). Since the Rnd acquired in the process of Step S111 is a uniform random number, in the process of Step S112 "[X]−k+1" (=[X−k+0.5]) is outputted in the probability of (1−Xfrac)/2 k; "[X]+k+1" ([X+k+0.5]) is outputted in the probability of (Xfrac−0.5)/2 k; and each integer in the range of "[X]−k+2" to "[X]+k−1" is outputted in the probability of ½k.

When intermediate gradation data in which Xfrac is smaller than 0.5 is inputted to perform the process of Step S111 under the condition where 2 k is set as SFT, a value of "X+Rnd+0.5" is in the range of X−k+0.5 to X+k+0.5 as shown in FIG. 5(C). Since the Rnd acquired in the process of Step S111 is a uniform random number, in the process of Step S112 "[X]−k" (=[X−k+0.5]) is outputted in the probability of (0.5−Xfrac)/2 k; "[X]+k" (=[X+k+0.5]) is outputted in the probability of (Xfrac+0.5)/2 k; and each integer in the range of "[X]−k+1" to "[X]+k−1" is outputted in the probability of ½k.

Accordingly, the expected value (formula is omitted) of the data outputted as a conversion result from the diffusion gradation converting circuit is also equal to X, in the above cases.

As described above, when the processes in Steps S111 and S112 are performed for the intermediate gradation data satisfying SFT/2≦[X]<255−SFT/2, the diffusion gradation converting circuit outputs, as a conversion result, the data of which the expected value is equal to X, independently from the SFT.

However, when the diffusion gradation converting circuit is configured to perform the processes in Steps S111 and S112 for every intermediate gradation data, the value of [X+Rnd+0.5] may become a negative value that cannot be outputted as Z' data, or may become a value equal to or greater than 256 that cannot be outputted as Z' data. For this reason, the diffusion gradation converting circuit of the image processing circuit 20 (gradation converting circuit 22) according to the present embodiment is configured to reduce (steps S106, S108, and S110) a generation range of Rnd so that the value of [X+Rnd+0.5] is in the range of 0 to 255, for the intermediate gradation data for which the value of [X+Rnd+0.5] is a negative value or a value equal to or greater than 256, as described above.

As described above, the image processing circuit 20 mounted on the printing apparatus 10 according to the present embodiment performs a sequence of processes including: "a process of converting 8-bit input gradation data into 16-bit intermediate gradation data; and a process of converting the intermediate gradation data into 8-bit output gradation data on the basis of an algorithm in which an expected value correspond to X (X is a value obtained by dividing intermediate gradation data by $2^8$)," in order to convert 8-bit input gradation data into 8-bit output gradation data. Since the image processing circuit 20 does not reduce the number of gradations at the time of gradation conversion (i.e., the number of gradations of input gradation data is equal to that of output gradation data), the image processing circuit 20 can perform the gradation conversion with a higher precision than the related-art image processing circuit. The printing apparatus 10 according to the present embodiment includes the image processing circuit 20 that generates the data for allowing the print engine 13 to perform the printing. Accordingly, when the printing apparatus 10 is installed in an office or the like, it is possible to realize a circumstance in which the printing can be performed with a higher quality than that for the case where the related-art printing apparatus is installed in the office or the like.

Modified Embodiment

The printing apparatus 10 and the image processing circuit 20 may be modified in various forms. For example, the image processing circuit 20 may be modified into a circuit having the number of bit of input gradation data or the number of bit of intermediate gradation data which is different from the numbers described above or into a circuit which does not include the color converting circuit 21 or the binarization and smoothing processing circuit 23. Further, the image processing circuit 20 may be modified into a circuit different from the image processing circuit 20 in that the manner of reducing the generation range of Rnd for the intermediate gradation data in which the value of [X+Rnd+0.5] is a negative value or 256 or more (e.g., a circuit generating Rnd in the range of −0.5 to 0.5).

The printing apparatus 10 is the so-called printer, but may be a printing apparatus using the image processing circuit 20 (e.g., an apparatus for printing such as a facsimile and a multifunctional apparatus) in addition to the printer.

What is claimed is:

1. A controller which is connectable to a print engine, the controller comprising: an image processing circuit operable to convert first data to second data to be output to the print engine;
   a CPU operable to input the first data to the image processing circuit; and
   a memory storing a gradation conversion table in which M-bit intermediate gradation data are correlated with each of N-bit input gradation data, wherein:
   the image processing circuit comprises: an input gradation converting circuit, operable to convert each of the input gradation data into the M-bit intermediate gradation data by using the gradation conversion table and output the converted M-bit intermediate gradation data; and a diffusion gradation converting circuit, operable to convert each of the intermediate gradation data outputted from the input gradation converting circuit into N-bit output gradation data and output the converted N-bit output gradation data,
   the diffusion gradation converting circuit acquires a uniform random number Rnd in the range of −SFT/2 to SFT/2 and outputs [X+Rnd+0.5] as the output gradation data for each of the intermediate gradation data in which X obtained by dividing a value of the intermediate gradation data by $2^{M-N}$ and a specified value SFT which is an integer preset in the image processing circuit satisfy a conditional expression "SFT/2$\leq$[X]$\leq 2^N-1-$SFT/2" (where [ ] is a Gauss symbol); and the diffusion gradation converting circuit acquires a uniform random number Rnd' in the range of $0\leq$[X+Rnd'+05]$\leq 2^N-1$ and outputs [X+Rnd'+0.5] as the output gradation data for each of the intermediate gradation data in which the X and the specified value SFT do not satisfy the conditional expression.

2. The controller as set forth in claim 1, wherein:
   the diffusion gradation converting circuit acquires the uniform random number Rnd' in the range of $-(2\cdot$[X]+[X−[X]+0.5])/2 to $(2\cdot$[X]+[X−[X]+0.5])/2 for each of the intermediate gradation data in which the X and the specified value SFT satisfy SFT/2>[X]; and
   the diffusion gradation converting circuit acquires the uniform random number Rnd' in the range of $-(2\cdot(2^N-1-$[X])−[X−[X]+0.5])/2 to $(2\cdot(2^N-1-$[X])−[X−[X]+0.5])/2 for each of the intermediate gradation data in which the X and the specified value SFT satisfy SFT/2$>2^N-1-$[X].

3. A printing apparatus comprising:
   the controller as set forth in claim 1; and
   the print engine operable to perform a printing operation on a sheet,
   wherein the controller operates the image processing circuit and controls the print engine to perform the printing operation on the basis of the output gradation data outputted from the image processing circuit when the print engine is allowed to perform the printing operation.

4. A gradation converting method to be performed in an image processing circuit including an input gradation converting circuit and a diffusion gradation converting circuit, the gradation converting method comprising:
   inputting N-bit input gradation data to the input gradation converting circuit;
   converting each of the N-bit input gradation data into M-bit intermediate gradation data by using a gradation conversion table in which the M-bit intermediate gradation data are correlated with each of the N-bit input gradation data; transferring the converted intermediate gradation data from the input gradation converting circuit to the diffusion gradation converting circuit;
   converting each of the outputted intermediate gradation data into N-bit output gradation data;
   outputting the converted output gradation data from the diffusion gradation converting circuit, wherein: for each of the intermediate gradation data in which X obtained by dividing a value of the intermediate gradation data by $2^{M-N}$ and a specified value SFT which is an integer preset in the image processing circuit satisfy a conditional expression "SFT/2$\leq$[X]$\leq 2^N-1-$SFT/2" (where [ ] is a Gauss symbol), a uniform random number Rnd in the range of −SFT/2 to SFT/2 is acquired and [X+Rnd+0.5] is outputted as the output gradation data; and for each of the intermediate gradation data in which the X and the specified value SFT do not satisfy the conditional expression, a uniform random number Rnd' in the range of $0\leq$[X+Rnd'+05]$\leq 2^N-1$ is acquired and [X+Rnd'+0.5] is outputted as the output gradation data.

* * * * *